United States Patent
Sebes et al.

(10) Patent No.: US 7,603,552 B1
(45) Date of Patent: Oct. 13, 2009

(54) PIRACY PREVENTION USING UNIQUE MODULE TRANSLATION

(75) Inventors: E. John Sebes, Menlo Park, CA (US); Rishi Bhargava, San Jose, CA (US); Dilip Naik, Redmond, WA (US)

(73) Assignee: McAfee, Inc., Santa Clara, CA (US)

( * ) Notice: Subject to any disclaimer, the term of this patent is extended or adjusted under 35 U.S.C. 154(b) by 945 days.

(21) Appl. No.: 11/122,872

(22) Filed: May 4, 2005

(51) Int. Cl.
*H04L 9/00* (2006.01)

(52) U.S. Cl. .................... 713/164; 717/168; 711/164

(58) Field of Classification Search ............ 726/26
See application file for complete search history.

(56) References Cited

U.S. PATENT DOCUMENTS

| | | | | |
|---|---|---|---|---|
| 4,688,169 | A | 8/1987 | Joshi | 364/200 |
| 4,982,430 | A | 1/1991 | Frezza et al. | 380/50 |
| 5,222,134 | A | 6/1993 | Waite et al. | 380/4 |
| 5,390,314 | A | 2/1995 | Swanson | 395/500 |
| 5,521,849 | A | 5/1996 | Adelson et al. | 364/570 |
| 5,560,008 | A | 9/1996 | Johnson et al. | 395/650 |
| 5,699,513 | A | 12/1997 | Feigen et al. | 395/187.01 |
| 5,778,349 | A | 7/1998 | Okonogi | 707/1 |
| 5,787,427 | A | 7/1998 | Benantar et al. | |
| 5,842,017 | A | 11/1998 | Hookway et al. | 395/707 |
| 5,907,709 | A | 5/1999 | Cantey et al. | 395/705 |
| 6,141,698 | A * | 10/2000 | Krishnan et al. | 719/331 |
| 6,275,938 | B1 * | 8/2001 | Bond et al. | 726/23 |
| 6,338,149 | B1 | 1/2002 | Ciccone, Jr. et al. | 714/38 |
| 6,356,957 | B2 | 3/2002 | Sanchez, II et al. | 709/328 |
| 6,393,465 | B2 | 5/2002 | Leeds | 709/207 |
| 6,442,686 | B1 | 8/2002 | McArdle et al. | 713/151 |
| 6,587,877 | B1 | 7/2003 | Douglis et al. | 709/224 |
| 6,769,115 | B1 | 7/2004 | Oldman | 717/126 |
| 6,832,227 | B2 | 12/2004 | Seki et al. | 707/101 |
| 6,834,301 | B1 | 12/2004 | Hanchett | 709/223 |
| 6,918,110 | B2 * | 7/2005 | Hundt et al. | 717/158 |
| 6,930,985 | B1 | 8/2005 | Rathi et al. | 370/254 |
| 6,988,101 | B2 | 1/2006 | Ham et al. | 707/10 |
| 7,065,767 | B2 | 6/2006 | Kambhammettu et al. | 719/310 |
| 7,082,456 | B2 | 7/2006 | Mani-Meitav et al. | 709/203 |

(Continued)

OTHER PUBLICATIONS

Kurt Gutzmann, "Access Control and Session Management in the HTTP Environment," Jan./Feb. 2001, pp. 26-35, IEEE Internet Computing.

*Primary Examiner*—Matthew B Smithers
(74) *Attorney, Agent, or Firm*—Patent Capital Group (57) ABSTRACT

A method for providing solidified software in a computing environment includes creating a new reference for a function in a function table; copying an address of the function and associating the address with the new reference; replacing the address associated with an old reference of the function with a dummy address; and substituting each old reference in normal code with the new reference, where injected code is not able to execute in the computing environment. The function table entries can be further randomized by reordering the entries, introducing intermediate mappings, or providing non-operative entries. Alternatively, all or part of the code of the function can be copied and moved to a different storage location and associated with the new reference. The copied code can be further randomized by the insertion of dummy code, utilizing reverse peephole techniques, varying the size of the copied portion, or interleaving non-operative code.

26 Claims, 7 Drawing Sheets

U.S. PATENT DOCUMENTS

| | | |
|---|---|---|
| 7,139,916 B2 | 11/2006 | Billingsley et al. .......... 713/182 |
| 7,177,267 B2 | 2/2007 | Oliver et al. ................ 370/216 |
| 7,251,655 B2 | 7/2007 | Kaler et al. ..................... 707/9 |
| 7,290,266 B2 | 10/2007 | Gladstone et al. |
| 7,302,558 B2 | 11/2007 | Campbell et al. ............... 713/1 |
| 7,353,501 B2 * | 4/2008 | Tang et al. .................. 717/130 |
| 7,363,022 B2 | 4/2008 | Whelan et al. .............. 455/411 |
| 7,441,265 B2 | 10/2008 | Staamann et al. |
| 2002/0099671 A1 | 7/2002 | Mastin Crosbie et al. ... 705/500 |
| 2003/0073894 A1 | 4/2003 | Chiang et al. ............... 600/407 |
| 2003/0074552 A1 | 4/2003 | Olkin et al. ................. 713/150 |
| 2003/0120811 A1 | 6/2003 | Hanson et al. .............. 709/245 |
| 2003/0120935 A1 | 6/2003 | Teal et al. .................... 713/188 |
| 2004/0015554 A1 | 1/2004 | Wilson ....................... 709/206 |
| 2004/0051736 A1 | 3/2004 | Daniell ....................... 345/752 |
| 2004/0143749 A1 | 7/2004 | Tajalli et al. |
| 2004/0230963 A1 | 11/2004 | Rothman et al. ............ 717/168 |
| 2004/0255161 A1 | 12/2004 | Cavanaugh ................. 713/201 |
| 2005/0018651 A1 | 1/2005 | Yan et al. .................... 370/352 |
| 2005/0228990 A1 | 10/2005 | Kato et al. .................. 713/167 |
| 2005/0262558 A1 | 11/2005 | Usov |
| 2007/0039049 A1 | 2/2007 | Kupferman et al. |
| 2007/0101435 A1 | 5/2007 | Konanka et al. |

* cited by examiner

PIRACY PREVENTION USING UNIQUE MODULE TRANSLATION

BACKGROUND

1. Field

The present invention relates to computer systems, and more particularly to the solidification of software to maintain the integrity of software and computer systems using unique module translation.

2. Related Art

The set of software available for execution on a computer is generally dynamic and modifiable, even when such modification is not desirable. Restricting the ability of users or administrators of a computer to install and remove software or to modify configuration of the existing software is enforced with passwords or verbal and written policies and guidelines. However, when passwords are used, possessors of administrative passwords generally have access beyond their immediate responsibilities.

Accordingly, there is a need for a technique for providing solidified (or "frozen") software for maintaining the integrity of software and computer systems. The present invention addresses such a need.

SUMMARY

A method for providing solidified software in a computing environment includes creating a new reference for at least one function in a function table; copying an address of the at least one function and associating the address with the new reference; replacing the address associated with an old reference of the at least one function with a dummy address; and substituting each old reference in normal code with the new reference, where injected code is not able to execute in the computing environment. The function table entries can be further randomized. The randomization can include reordering the entries, introducing intermediate mappings, or providing non-operative entries with the operative entries. Alternatively, all or part of the code of the function can be copied and moved to a different storage location and associated with the new reference. To save storage space, a portion of the code can be copied and moved, with the copied portion referencing the remaining portion of the code at its original location. The copied code can be further randomized. The randomization can include the insertion of dummy code, utilizing reverse peephole techniques, varying the size of the copied portion, or interleaving non-operative code with the copied code. In the above manner, the code for the function is solidified.

DETAILED DESCRIPTION

The following serves as a glossary of terms as used herein:

Computer: Any computing system comprising an operating system providing a set of resources for use by one or more pieces of software for execution on the computing system.

Injected Code. A set of instructions attempting to access a computing environment that has not been determined to have authorization to be installed or be executed in the computing environment.

Interface: A language, protocol or other boundary for providing a service or making available a resource to a piece of software on a computer. An interface comprises a name space, knowledge of which is needed for successful usage of the interface. For a given interface to a service or resource, an implementation of the service or resource fulfills requests made through the interface. One example of an interface comprises an Application Programming Interface (API) such as a system call interface of an operating system, wherein the name space comprises system call names or system call addresses, and the implementation comprises the portion of the operating system implementing the actual system calls. Another example of an interface comprises a set of function calls to a library, wherein the name space comprises function names or function addresses, and the implementation comprises the actual library code implementing the functions. Other interface examples include language APIs (such as a PERL API, Java API, PHP API, shell script APIs, etc.), database APIs, an interface to a file system of a computer (wherein the name space comprises a set of file names), and any interface to a container of data.

Normal Code: A set of instructions for execution on a computer that has been determined to have authorization to install and execute in a computing environment.

Reference: A thing that relates to an instruction for execution on a computer. The thing can be any mechanism, such as a name, a direct or indirect address for the location of the instruction, a number, a place in a data structure, an index in a list, an entry in a table, or an object in a data structure of any kind.

Software: Any set of instructions for execution on a computer. A piece of software may use one or more services or resources as provided by the computer through one or more interfaces.

Solidification: Creation of a unique computing system by converting uniform systems into functionally equivalent but logically unique systems, generally by breaking assumptions about a computer that software programs normally make in order to execute on that computer.

Figure 1A:
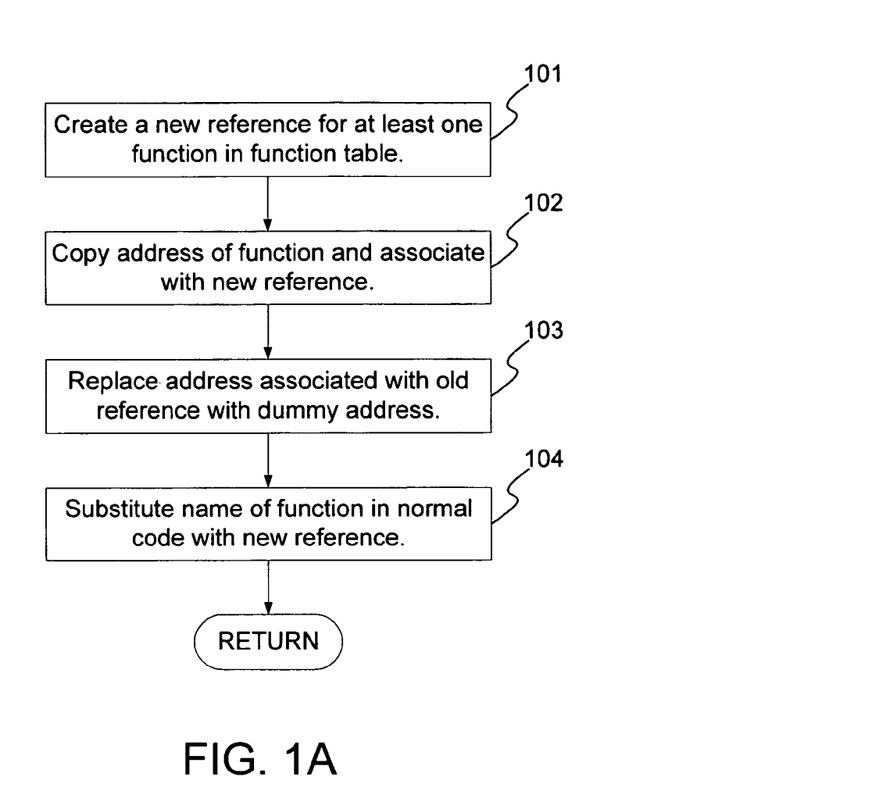
FIGS. 1A-1B illustrate a first embodiment of a method for providing solidified software for maintaining the integrity of software and computer systems.
Figure 1B:
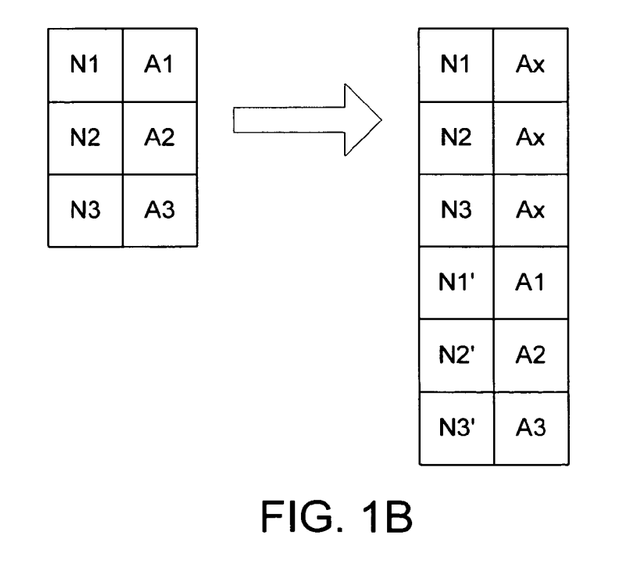

FIGS. 1A-1B illustrate a first embodiment of a method for providing solidified software for maintaining the integrity of software and computer systems. Referring to FIG. 1A, a new reference for at least one function in a function table is created, via step 101. Next, the address of the function is copied and associated with the new reference, via step 102. The address of the function is then replaced with a dummy address, via step 103. Next, the name of the function in the normal code is substituted with the new reference, via step 104.

For example, referring to FIG. 1B, assume that the references are names for three functions {N1, N2, N3} at addresses {A1, A2, A3}, respectively, stored in the function table. New names {N1', N2', N3'} are created for each function, via step 101. The addresses of each function {A1, A2, A3} are copied and associated with the new names {N1', N2', N3'}, via step 102. The addresses of the functions associated with the old names {N1, N2, N3} are replaced with dummy addresses, {Ax, Ax, Ax}, via step 103. Then, the names of the functions {N1, N2, N3} in the normal code are substituted with the new names {N1', N2', N3'}, via step 104. In this manner, if an injected code attempts to access function N1, it is directed to the dummy address Ax and thus does not call the actual function. The code for the function is thus solidified. Although in the example, the reference is a name, the reference can be a number instead.

The dummy address, Ax, can initiate any number of operations. The dummy address can point to an invalid address, a function that performs nothing, a function that performs an alternative function (execution exception, logging, etc.), or any other possible operation.

Figure 2A:
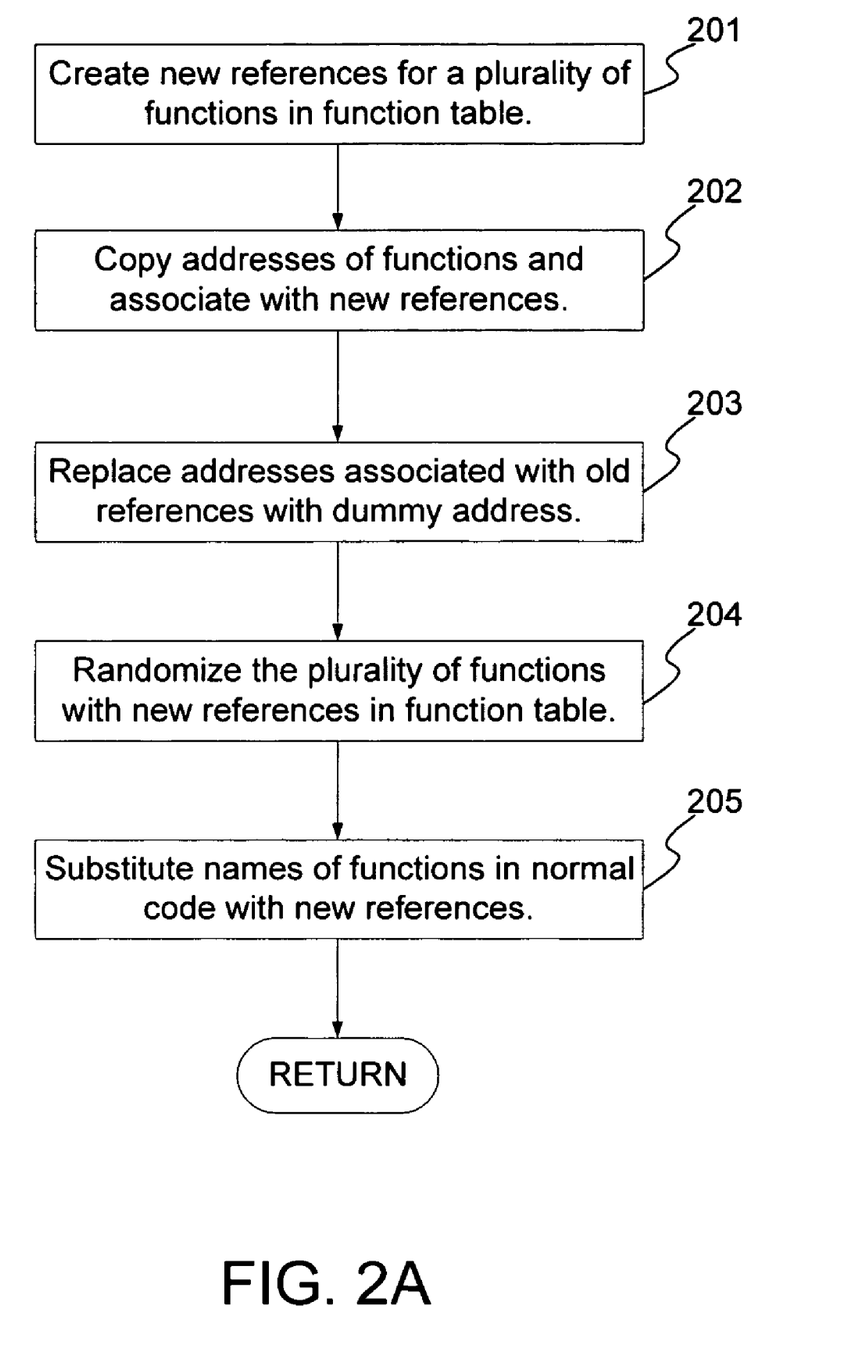
FIGS. 2A-2C illustrate a second embodiment of a method for providing solidified software for maintaining the integrity of software and computer systems.
Figure 2B:
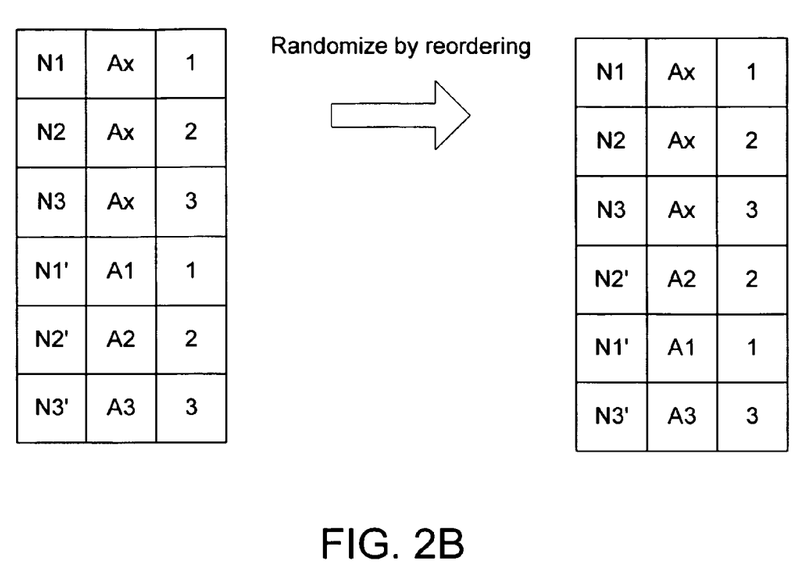
Figure 2C:
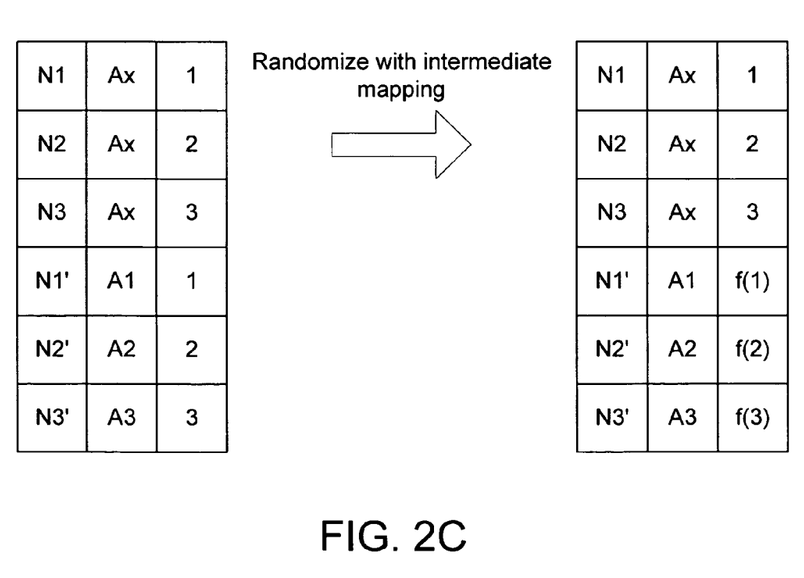

FIGS. 2A-2C illustrate a second embodiment of a method for providing solidified software for maintaining the integrity of software and computer systems. Referring to FIG. 2A, first, new references for a plurality of functions in a function table are created, via step 201. Next, the addresses of the functions are copied and associated with the new references, via step 202. The addresses of the functions are replaced with dummy addresses, via step 203. Then, the plurality of functions with the new references in the function table is further randomized, via step 204. The references of these functions in the normal code are substituted with the new references, via step 205.

The randomization can be one of any number of techniques. One randomization technique is the reordering of the new function entries. For example, referring to FIG. 2B, new names {N1', N2', N3'} are created for the functions with old names {N1, N2, N3}, via step 201, the addresses {A1, A2, A3} are copied and associating with the new names {N1', N2', N3'}, via step 202, along with each of their ordinal numbers {1, 2, 3}. The addresses {A1, A2, A3} for the functions with the old names {N1, N2, N3} are replaced with dummy addresses {Ax, Ax, Ax}, via step 203. Then, the new names {N1', N2', N3'} are further randomized by recording them {2, 1, 3}, via step 204. In this manner, injected code cannot locate the actual function addresses by identifying the order patterns.

Another randomization technique is to introduce an intermediate mapping for the ordinal numbers. For example, referring to FIG. 2C, after performing the creating, copying, and replacing steps 201-203, an intermediate mapping is introduced for the ordinal numbers {f(1), f(2), f(3)}. The pattern of the ordinal numbers {1, 2, 3} is thus changed, such that injected code cannot identify the pattern as that belonging to ordinal numbers. Other randomization techniques are also possible, such as introducing dead space between the table entries. In each of the randomization techniques, the pattern of the entries is randomized so that it is not recognizable by injected code.

Thus, in both randomization techniques, the place in a data structure cannot be used as a reference.

Figure 3:
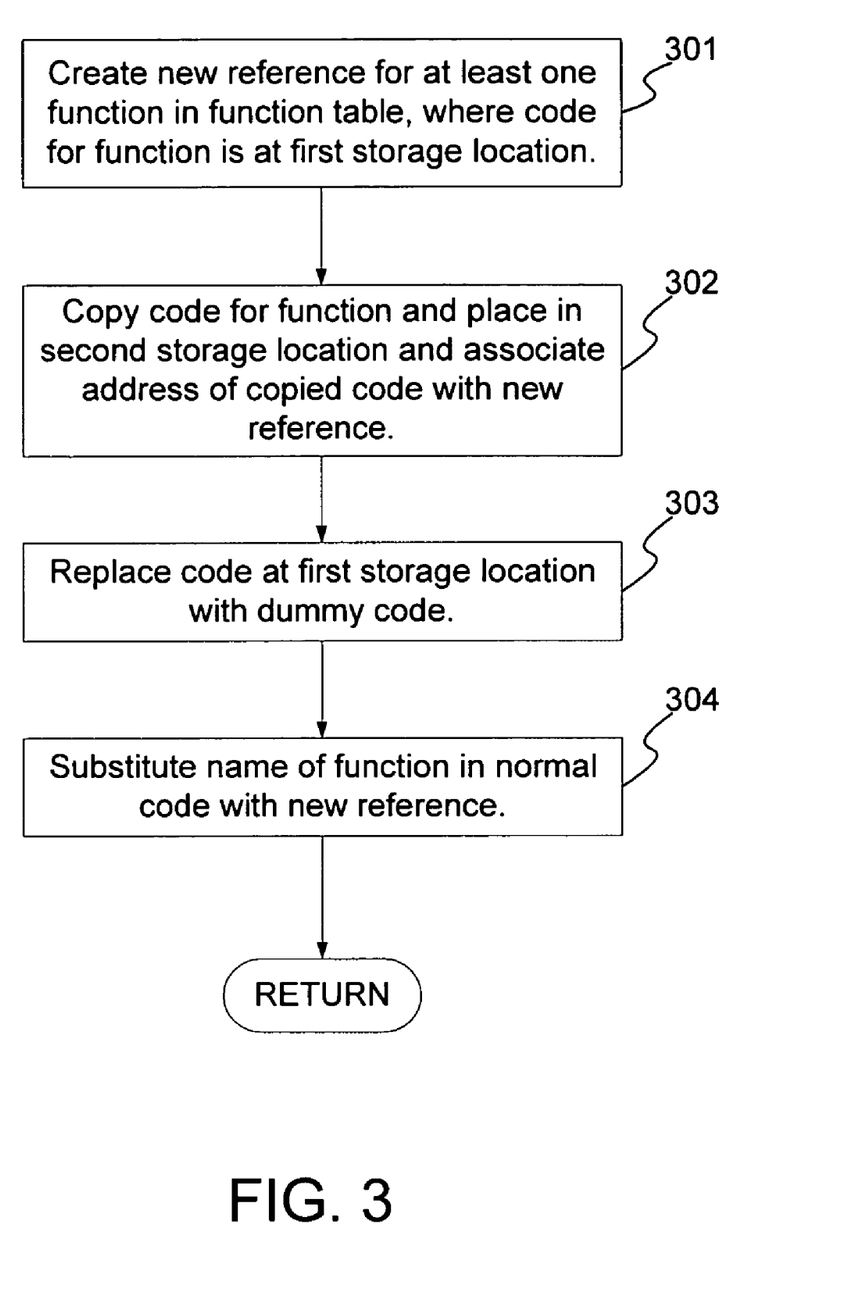
FIG. 3 illustrates a third embodiment of a method for providing solidified software for maintaining the integrity of software and computer systems.

FIG. 3 illustrates a third embodiment of a method for providing solidified software for maintaining the integrity of software and computer systems. First, a new reference for at least one function in the function table is created, via step 301, where the code for the function is at a first storage location. The storage location can be on any storage medium, such as memory or a disk. Next, the code for the function is copied and placed in a second storage location, and the addresses of the copied code is associated with the new reference, via step 302, by making the corresponding changes in the function table. The code at the first storage location is replaced with dummy code, via step 303. The normal code is scanned, and each reference to the reference of the function in the normal code is then substituted with the new reference, via step 304. The dummy code can perform the same types of operations as the dummy functions. In this manner, the address of the code for the function cannot be used as a reference. When injected code attempts to access the code at the first storage location, it does not actually call the function.

Figure 4A:
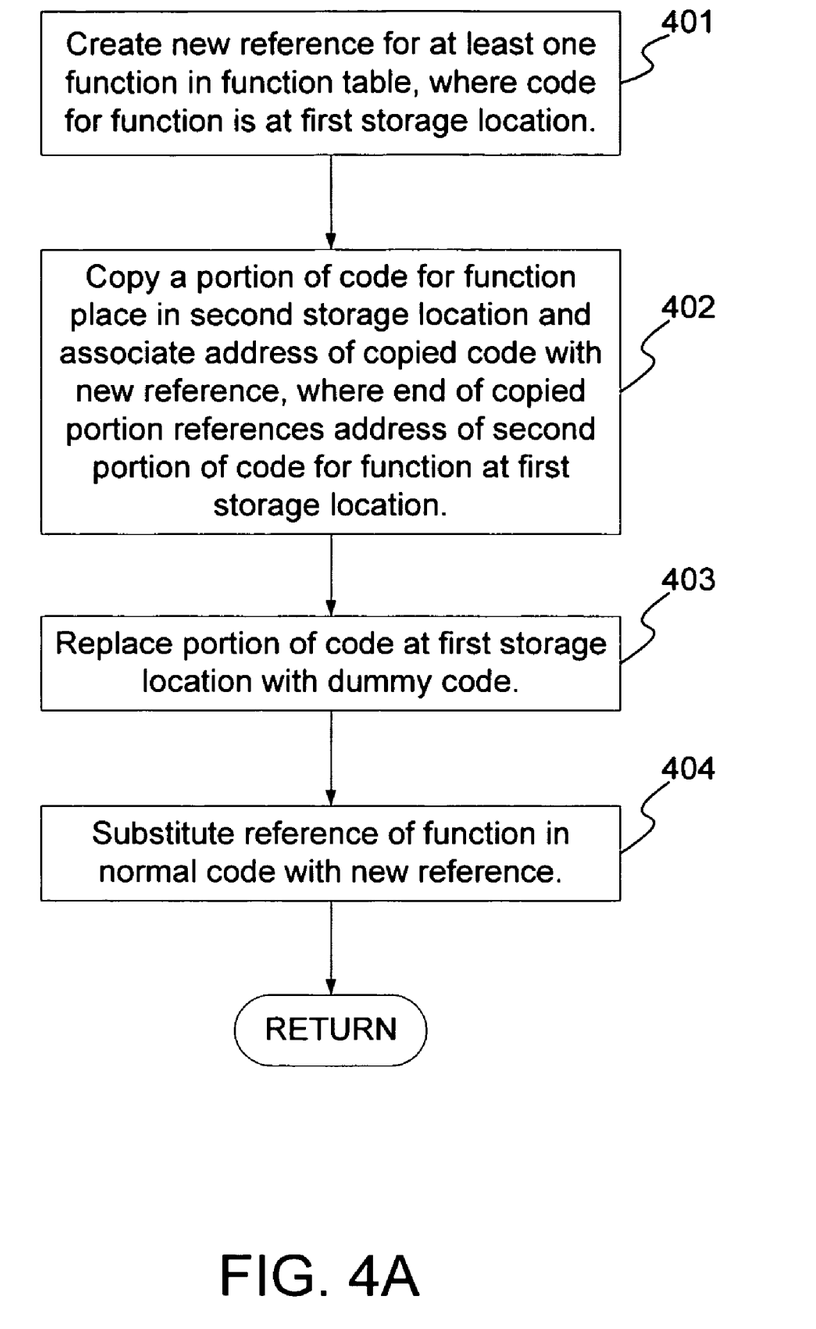
FIGS. 4A-4B illustrate a fourth embodiment a method for providing solidified software for maintaining the integrity of software and computer systems.
Figure 4B:
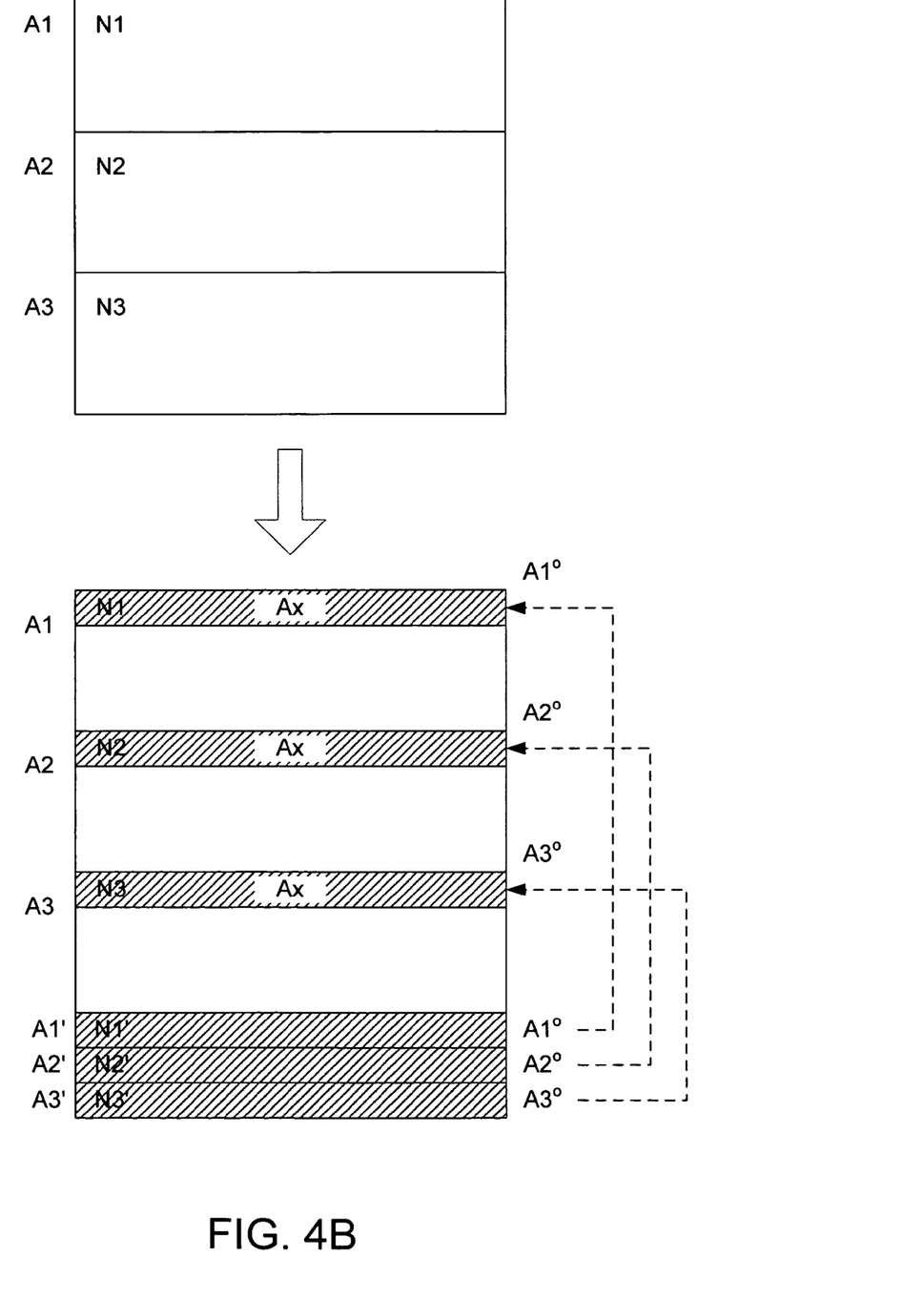

FIGS. 4A-4B illustrate a fourth embodiment a method for providing solidified software for maintaining the integrity of software and computer systems. Referring to FIG. 4A, a new reference for at least one function in the function table is created, via step 401, where the code for the function is at a first storage location. Then, a portion of the code for the function is copied and placed at a second storage location, via step 402. The addresses of the copied code is associated with the new reference, where the end of the copied portion references the address of a second portion of the code for the function at the first storage location. The portion of the code at the first storage location is then replaced with dummy code, via step 403. The normal code is scanned, and each reference to the function in the normal code is then substituted with the new reference, via step 404.

For example, referring to FIG. 4B, assume that the code for functions with names {N1, N2, N3} in the function table are located at the addresses {A1, A2, A3}. New names {N1', N2', N3'} for the functions are created, via step 401. A first portion (shaded) of the code for each function are then copied and placed at the addresses {A1', A2', A3'}, via step 402, and associated with the new names {N1', N2', N3'} by making corresponding changes in the function table. The end of the copied portions references the addresses of the second portions of the code {A1°, A2°, A3°} for the functions at the first locations {A1, A2, A3}. Thus, once the code at the addresses {A1', A2', A3'} are executed, the execution of the function continues with the code at the referenced addresses {A1°, A2°, A3°}. In this manner, the amount of copied code is less than the entire code for a function, saving storage space, while also preventing injected code from calling the actual functions by accessing the original addresses for the functions.

Although the example of FIG. 4B illustrates names as references, one or ordinary skill in the art will understand that the same technique of copying and moving a portion of the code is also applicable when the addresses {A1, A2, A3} themselves are the references, without the use of names for the functions, without departing from the spirit and scope of the present invention.

Figure 5:
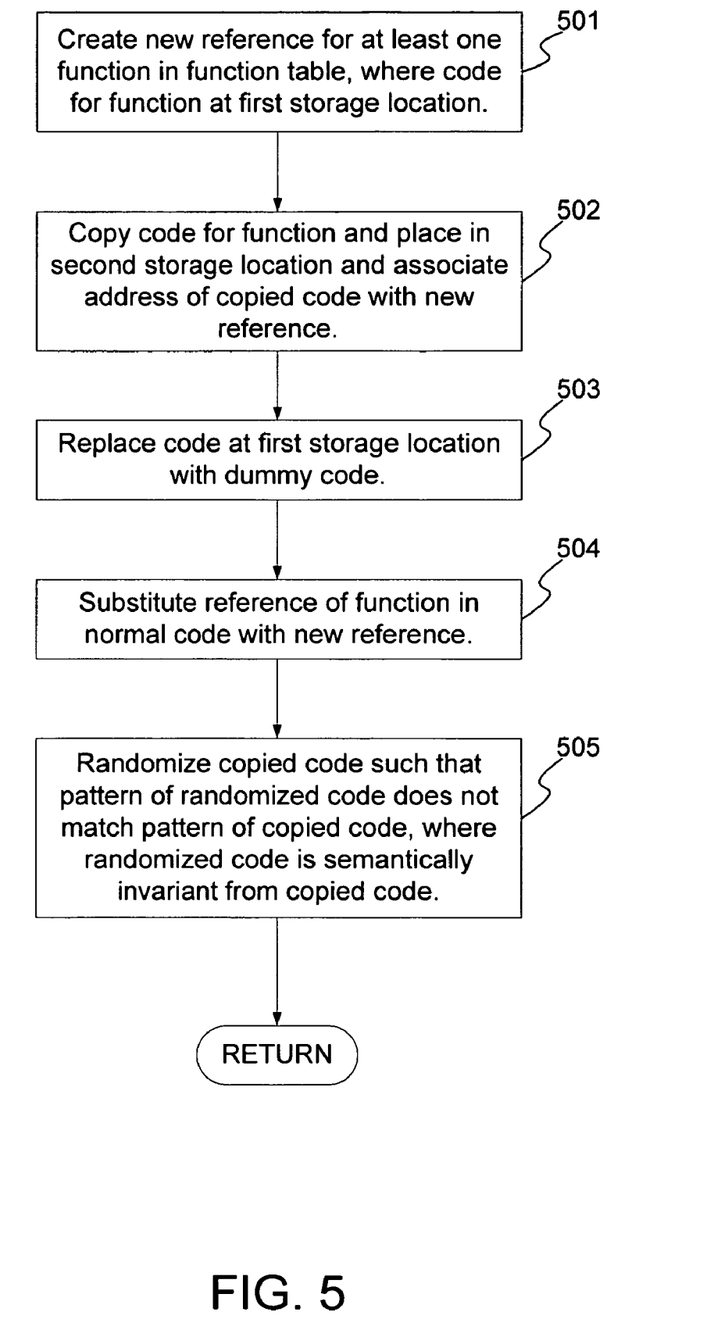
FIG. 5 illustrates a fourth embodiment a method for providing solidified software for maintaining the integrity of software and computer systems.

FIG. 5 illustrates a fourth embodiment a method for providing solidified software for maintaining the integrity of software and computer systems. First, a new reference for at least one function in the function table is created, via step 501, where the code for the function is at a first storage location. The code for the function is then copied and placed in a second storage location, and the address of the copied code is associated with the new reference, via step 502. Alternatively, a portion of the code for the function can be copied, as described above with FIG. 4A. The code at the first storage location is replaced with dummy code, via step 503. The normal code is then scanned, and each reference to the function in the normal code is substituted with the new reference, via step 504. Then, the copied code is randomized, via step 505, such that the pattern of the randomized code does not match the pattern of the copied code, where the randomized code is semantically invariant from the copied code.

The randomization can be any number of techniques, such as the insertion of dummy code, a reverse peephole technique, varying the size of the portion of code copied, and interleaving dead space into the copied code. Other randomization techniques can be used. By randomizing normal code in this manner, the normal code is able to continue executing in the computing environment while injected code that is not authorized to be installed or executed in the computing environment is not.

The various randomizations of the entries in the function table or of the function code described above can be used in any combination without departing from the spirit and scope of the present invention.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for providing solidified software in a computing environment, comprising:
    (a) creating a new reference for at least one function in a function table;
    (b) copying an address of the at least one function and associating the address with the new reference;
    (c) replacing the address associated with an old reference of the at least one function with a dummy address; and
    (d) substituting each old reference in normal code with the new reference, wherein injected code is not able to execute in the computing environment.

2. The method of claim 1, wherein the normal code comprises a set of instructions for execution on a computer that has been determined to have authorization to be install and execute in the computing environment.

3. The method of claim 1, wherein the injected code comprises a set of instructions attempting to access the computing environment that has not been determined to have authorization to be installed or be executed in the computing environment.

4. The method of claim 1, further comprising:
    (e) randomizing entries for a plurality of functions with new references in the function table.

5. The method of claim 4, wherein the randomizing (e) comprises:
    (e1) reordering the entries.

6. The method of claim 4, wherein the randomizing (e) comprises:
    (e1) providing an intermediate mapping for the entries.

7. The method of claim 4, wherein the randomizing (e) comprises:
    (e1) providing non-operating entries into the function table.

8. The method of claim 1, wherein the reference comprises one or more of the group consisting of:
    a name;
    a number;
    an address; and
    a place in a data structure.

9. A method for providing solidified software in a computing environment, comprising:
    (a) creating a new reference for at least one function in a function table, wherein code for the at least one function is at a first storage location;
    (b) copying the code and placing the code in a second storage location and associating an address of the copied code with the new reference;
    (c) replacing the code at the first storage location with dummy code; and
    (d) substituting each reference of the at least one function in normal code with the new reference, wherein injected code is not able to execute in the computing environment.

10. The method of claim 9, wherein the normal code comprises a set of instructions for execution on a computer that has been determined to have authorization to be install and execute in the computing environment.

11. The method of claim 9, wherein the injected code comprises a set of instructions attempting to access the computing environment that has not been determined to have authorization to be installed or be executed in the computing environment.

12. The method of claim 9, further comprising:
    (e) randomizing the copied code, such that a pattern of the randomized code does not match a pattern of the copied code, wherein the randomized code is semantically invariant from the copied code.

13. The method of claim 12, wherein the randomizing (e) comprises:
    (e1) inserting dummy code.

14. The method of claim 12, wherein the randomizing (e) comprises:
    (e1) utilizing a reverse peephole technique.

15. The method of claim 12, wherein the randomizing (e) comprises:
    (e1) interleaving non-operative instructions into the copied code.

16. The method of claim 12, wherein the randomizing (e) comprises:
    (e1) varying a size of the copied code.

17. The method of claim 9, wherein the reference comprises one or more of the group consisting of:
    a name;
    a number;
    an address; and
    a place in a data structure.

18. A method for providing solidified software in a computing environment, comprising:
    (a) creating a new reference for at least one function in a function table, wherein code for the at least one function is at a first storage location;
    (b) copying a first portion of the code for the at least one function and placing the copied code at a second storage location;
    (c) associating an address of the copied code with the new reference, wherein an end of the copied code references an address of a second portion of the code for the at least one function at the first storage location;
    (d) replacing the first portion of the code at the first storage location with dummy code; and
    (e) substituting each reference of the function in normal code with the new reference, wherein injected code is not able to execute in the computing environment.

19. The method of claim 18, wherein the normal code comprises a set of instructions for execution on a computer that has been determined to have authorization to be install and execute in the computing environment.

20. The method of claim 18, wherein the injected code comprises a set of instructions attempting to access the computing environment that has not been determined to have authorization to be installed or be executed in the computing environment.

21. The method of claim 18, further comprising:
(e) randomizing the copied code, such that a pattern of the randomized code does not match a pattern of the copied code, wherein the randomized code is semantically invariant from the copied code.

22. The method of claim 21, wherein the randomizing (e) comprises:
(e1) inserting dummy code.

23. The method of claim 21, wherein the randomizing (e) comprises:
(e1) utilizing a reverse peephole technique.

24. The method of claim 21, wherein the randomizing (e) comprises:
(e1) interleaving non-operative instructions into the copied code.

25. The method of claim 21, wherein the randomizing (e) comprises:
(e1) varying a size of the copied code.

26. The method of claim 18, wherein the reference comprises one or more of the group consisting of:
a name;
a number;
an address; and
a place in a data structure.

* * * * *

UNITED STATES PATENT AND TRADEMARK OFFICE
CERTIFICATE OF CORRECTION

PATENT NO.       : 7,603,552 B1                              Page 1 of 1
APPLICATION NO.  : 11/122872
DATED            : October 13, 2009
INVENTOR(S)      : Sebes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1197 days.

Signed and Sealed this

Fifth Day of October, 2010

David J. Kappos
*Director of the United States Patent and Trademark Office*